(12) United States Patent
Consiglio et al.

(10) Patent No.: US 10,113,273 B2
(45) Date of Patent: Oct. 30, 2018

(54) INTERLOCKING HEATED PATIO STONES AND SYSTEM

(76) Inventors: Nunzio Consiglio, Mississauga (CA); John Kim, Ottawa (CA); Miles Hammond, Ottawa (CA); Kevin Bailey, Ottawa (CA)

( * ) Notice: Subject to any disclaimer, the term of this patent is extended or adjusted under 35 U.S.C. 154(b) by 872 days.

(21) Appl. No.: 13/468,436

(22) Filed: May 10, 2012

(65) Prior Publication Data

US 2013/0119043 A1    May 16, 2013

Related U.S. Application Data

(60) Provisional application No. 61/484,401, filed on May 10, 2011.

(51) Int. Cl.
| | |
|---|---|
| *E01C 11/26* | (2006.01) |
| *H01R 13/00* | (2006.01) |
| *E01C 5/00* | (2006.01) |
| *F24D 13/02* | (2006.01) |
| *E04F 11/116* | (2006.01) |
| *E04F 15/02* | (2006.01) |
| *E04F 15/08* | (2006.01) |

(52) U.S. Cl.
CPC .............. *E01C 11/265* (2013.01); *E01C 5/00* (2013.01); *F24D 13/022* (2013.01); *H01R 13/00* (2013.01); *E04F 11/116* (2013.01); *E04F 15/02038* (2013.01); *E04F 15/02183* (2013.01); *E04F 15/087* (2013.01); *E04F 2201/0138* (2013.01); *E04F 2201/0517* (2013.01); *Y02B 30/26* (2013.01)

(58) Field of Classification Search
CPC .. H05B 2203/014; F24D 13/024; H01R 31/06
USPC ................ 392/313, 318; 219/213, 494, 541; 439/268, 502
See application file for complete search history.

(56) References Cited

U.S. PATENT DOCUMENTS

| | | | | |
|---|---|---|---|---|
| 2,521,540 | A | * | 9/1950 | Richardson ............. E04C 2/521 219/213 |
| 2,859,322 | A | * | 11/1958 | Glazier et al. ................ 338/208 |
| 3,626,149 | A | * | 12/1971 | Carney et al. ................ 219/213 |
| 4,564,745 | A | * | 1/1986 | Deschenes .................... 219/213 |
| 4,896,831 | A | | 1/1990 | Choi |
| 5,233,971 | A | | 8/1993 | Hanley |
| 5,855,494 | A | * | 1/1999 | Blaszczyk ............. H01R 31/02 361/735 |
| 6,127,653 | A | | 10/2000 | Samuels |

(Continued)

*Primary Examiner* — Jimmy Chou
(74) *Attorney, Agent, or Firm* — Emerson Thomson Bennett LLC; Timothy D. Bennett

(57) ABSTRACT

An interconnected heated patio stone and system are disclosed, the stone consisting of a durable, heat-transmitting upper layer, and an insulating lower layer, a heating cable running within the stone, and having two interconnections at the edge of the stone. The interconnection has a bracket to connect with the cable, a receptacle for joining electrically to a bridging connector, and an electrical linkage making an electrical connection available. Each stone is connected with another by a bridging connector, which contains an articulated wire, and has a basin and cap at each end for electrically joining, in a sealed manner, with the receptacle. The system consists of two or more stones interconnected using bridging connectors, the whole system also connected to a power source.

5 Claims, 16 Drawing Sheets

(56) References Cited

U.S. PATENT DOCUMENTS

| | | | | |
|---|---|---|---|---|
| 6,552,310 | B1* | 4/2003 | Hulldin | F24D 13/02 |
| | | | | 219/217 |
| 7,862,375 | B2* | 1/2011 | Oosterling | F24D 13/022 |
| | | | | 219/528 |
| 7,880,121 | B2* | 2/2011 | Naylor | 219/213 |
| 2004/0245234 | A1* | 12/2004 | Gehring | 219/213 |
| 2011/0021050 | A1* | 1/2011 | Byrne | 439/215 |
| 2011/0253694 | A1* | 10/2011 | Consiglio | H05B 3/28 |
| | | | | 219/213 |

\* cited by examiner

INTERLOCKING HEATED PATIO STONES AND SYSTEM

This application claims priority to U.S. Ser. No. 61/484,401, entitled INTERLOCKING HEATED PATIO STONE SYSTEM, filed May 10, 2011, which is incorporated herein by reference in its entirety.

I. BACKGROUND OF THE INVENTION

A. Field of Invention

The invention relates to the field of patio stones and more specifically to heated patio stones and a system for interlocking heated patio stones.

B. Description of the Related Art

Heated driveways have been around for several decades in order to help facilitate the management of ice and snow. From downward inclined driveways for underground parking to standard non-inclined household driveways and walkways, these heated systems have helped prevent car accidents, reduced slipping and falling and assisted in snow and ice removal. Previous attempts have been made in order to find new and inventive ways to create and manufacture systems capable of doing the aforementioned tasks. Such systems include U.S. Pat. No. 6,127,653 (Samuels) and U.S. Pat. No. 5,233,971 (Hanley). Hanley's invention includes an apparatus to heat a driveway using a fluid serpentine conduit powered by a solar panel. This serpentine conduit is below the driveway and gets heated by means of the solar panel. Unfortunately, this device is primarily utilized for driveways; it is inconvenient to accommodate smaller surfaces that require less heating. On the other hand, Samuels' invention includes a method and apparatus for maintaining the driveway clear of ice and snow. This device has a plurality of electric heating devices along the driveway to melt ice and snow. However, these devices can be cumbersome as they are not under or part of the concrete itself, therefore heating the driveway by means of heat sources heating an outer thermal panel.

In a similar field, heated tiles have also been prominent in some homes—usually in tiled rooms such as kitchens and bathrooms—serving to add comfort when walking. Previous attempts have also been made in this field in order to construct and manufacture heated tiles, such as U.S. Pat. No. 4,896,831 (Choi). Choi's invention comprises of an airtight sealed chamber beneath the tiled floor, whereby an electric heater heats the air within, thus warming the concrete plate above it. Unfortunately, this system is utilized for indoors and is not suitable for outdoor environments.

As such, there is a need for a device that can overcome the drawbacks described above. These features of the invention will be apparent from review of the disclosure, drawings and description of the invention below.

II. SUMMARY OF THE INVENTION

The present invention describes an interconnectable heated patio stones and system comprising of several elements. First, of a power cord for an electrical connection to a power supply. Second, of at least a first and a second heated patio stone, each stone comprising: a load-supporting thermally conductive upper layer; an insulating lower layer; and an electrical heating cable, commencing at a first interconnection and terminating at a second interconnection, each interconnection for electrically connecting to adjacent stones, and each interconnection comprising of a bracket, for attachment to a cable end; a receptacle for receiving a bridging connector; and an electrical linkage, fitting between the bracket and the receptacle, connecting, electrically with the cable end attached to the bracket and being available within said receptacle. Third, of at least one elongatable bridging connector, for forming an electrical connection between two stones, comprising of an expandable articulated section containing electric wire: a first basin on the first side of the articulated section, closed by a first cap having an electrical plug, which plug is electrically connected to the first side of said wire; and a second basin on the second side of the articulated section, closed by a second cap having an electrical plug, which plug is electrically connected to the second side of said wire; wherein each said stone is each electrically connected to another stone by a bridging connector, the bridging connector fitting within said receptacle forming a connection that is sealed by a sealing agent, and wherein a plug of said bridging connector forms an electrical connection with said electrical linkage, and wherein the connection of said electrical plug with said wire enables an electrical connection between the wire and the cable, and wherein said power cord connects at least one stone to a power supply.

The present device also describes a heated patio stone, comprising of a load-supporting thermally-conductive upper layer; an insulating lower layer; and an electrical heating cable, commencing at a first interconnection and terminating at a second interconnection, each interconnection for electrically connecting to adjacent stones, and each interconnection comprising of a bracket, for attachment to a cable end; a receptacle for receiving a bridging connector; and an electrical linkage, fitting between the bracket and the receptacle, connecting electrically with the cable end attached to the bracket and being available within said receptacle, wherein each bracket is attached to one cable end such that the electrical linkage is available within the receptacle.

The present device also describes an elongatable bridging connector, for forming an electrical connection between two stones, comprising of an expandable articulated section containing electric wire; a first basin on the first side of the articulated section, closed by a first cap having an electrical plug, which plug is electrically connected to the first side of said wire; and a second basin on the second side of the articulated section, closed by a second cap having an electrical plug, which plug is electrically connected to the second side of said wire, wherein said bridging connector is adapted to fit within a receptacle and enable an electrical connection. The present device also describes a patio stone, wherein the upper layer is made from a material selected from the group consisting of concrete, Liquid Granite™, Hempcrete™, concrete with graphite or aluminum additives and carbon-fiber reinforced polymer.

The present device also further describes a patio stone, wherein the lower layer is made from a material selected from the group consisting of rigid foam, molded expanded polystyrene and Kevlar-fiber reinforced polymer.

Finally, the present device describes a system, wherein the patio s ones are positioned so as to form stairs.

III. BRIEF DESCRIPTION OF THE DRAWINGS

It will now be convenient to describe the invention with particular reference to one embodiment of the present invention. It will be appreciated that the drawings relate to one embodiment of the present invention only and are not to be taken as limiting the invention.

IV. DETAILED DESCRIPTION OF THE INVENTION

The present invention will now be described more fully hereinafter with reference to the accompanying drawings, in which preferred and other embodiments of the invention are shown. No embodiment described below limits any claimed invention and any claimed invention may cover processes or apparatuses that are not described below. The claimed inventions are not limited to apparatuses or processes having all the features of any one apparatus or process described below or to features common to multiple or all of the apparatuses described below. It is possible that an apparatus or process described below is not an embodiment of any claimed invention. The applicants, inventors or owners reserve all rights that they may have in any invention claimed in this document, for example the right to claim such an invention in a continuing application and do not intend to abandon, disclaim or dedicate to the public any such invention by its disclosure in this document.

Figure 1:
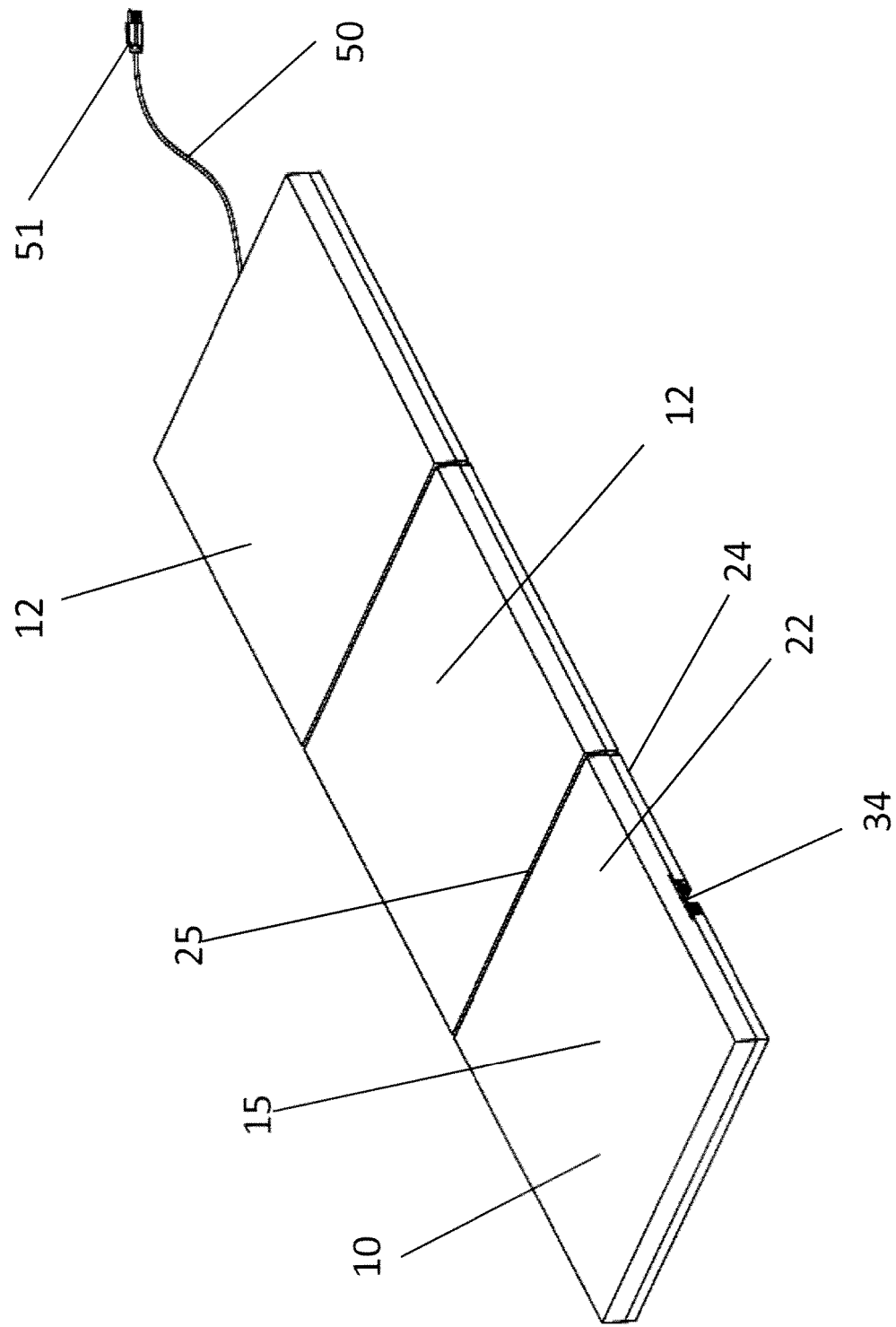
FIG. 1 is a perspective view of a patio stone system, according to one embodiment of the current invention.

With reference to FIG. 1, three patio stones are shown interconnected, the leftmost being a corner stone 10 and the rightmost two being inline stones 12. Each stone has an upper layer 22 and a lower layer 24. In one embodiment, the upper layer 22 is formed of concrete and the lower layer 24 is formed of rigid foam and performs an insulating function, as well as settling the stone on uneven ground. The stones are joined at a junction 25, wherein the sides of the stones 10, 12 meet one another, and the stones 10, 12 are electrically connected to one another as well, by means of a bridging connector (not shown), to be described in greater detail below. One skilled in the art would appreciate that the upper layer 22 may be made of other materials such as Liquid Granite™, Hempcrete™, carbon-fiber reinforced polymer, or any other geotextile-based or polymer-based thermally conductive material that is capable of supporting a load, and that the lower layer 24 may instead consist of molded expanded polystyrene or Kevlar-fiber reinforced polymer, without removing the embodiment from the scope of the invention.

Figure 2:
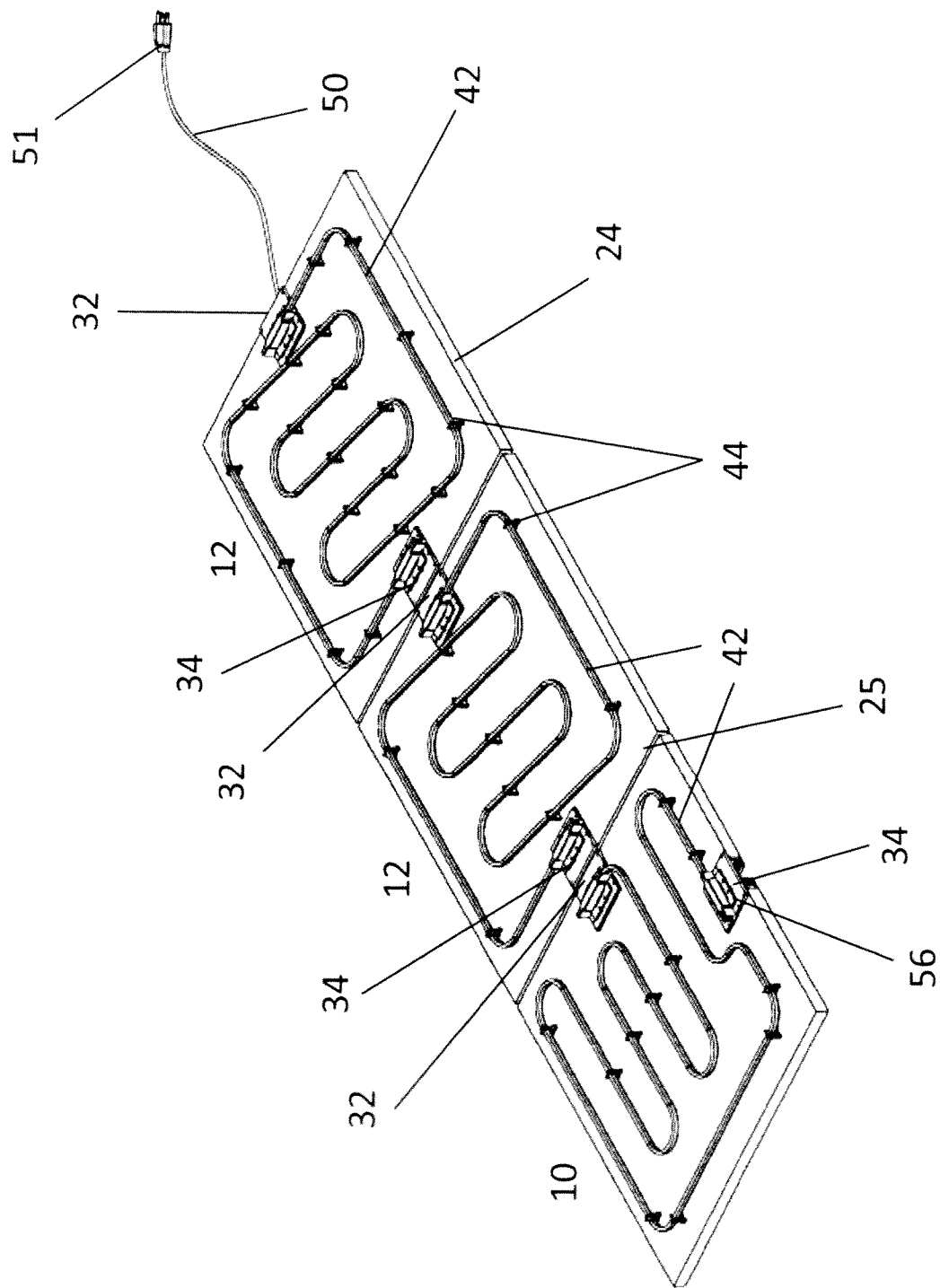
FIG. 2 is a perspective view of a patio stone system with the upper layer removed, according to one embodiment of the current invention.

With reference to FIG. 2, the same three patio stones are shown as in FIG. 1 with the upper layer 22 not shown. With further reference to FIGS. 1 and 2, the corner stone 10 and inline stone 12 are different from one another in that the corner stone 10 has a first interconnection 32 oriented at 90° with reference to the center 15 of the stone to its second interconnection 34, while the inline stones 12 have a first interconnections 32 at one side, and the second interconnection 34 at the opposite end. Each stone 10, 12 has two interconnections 32, 34. The interconnections 32, 34 serve to connect two adjacent tiles physically with reference to position, as well as electrically, and will be discussed in greater detail below. The heating system of each tile consists of a length electrical resistive heating cable 42 set out in a pattern across the lower layer 24 of the stone 10, 12, such that it evenly covers the surface area of the stone for purposes of heating the stone 10, 12. As electricity passes through the cable 42, it radiates heat through the upper layer 22 of the stone 10, 12. The pattern of the corner stone 10 may vary from the pattern of the inline stone 12 as the interconnections 32, 34 are positioned differently. The cable 42 commences at a first interconnection 32 of the stone 10, 12 and terminates at a second interconnection 34. The spacing of the pattern of the cable 42 is dictated by the characteristics of the heating cable 42 itself, however the intention is that every inch of the upper layer 22 is heated by the cable 42. For example, if the effective heating radius of the cable through concrete is 2" from the cable, then the pattern of the cable would be designed so that lengths of cable 42 are never further than 4" from one another, and no further than 2" from the edges of the upper layer 22. Depending on the length of the articulated section (not shown) of the bridging connector (not shown), described in detail below, these lengths are variable, and a variation in this length remains within the scope of the invention. The interconnections 32, 34 have a bracket 56 to which the cable is attached. The cable 42 is formed into a pattern and held in place, above the lower layer 24, by means of a series of clips 44. In one embodiment the lower layer 24 has an aluminum reflective surface coating (not shown), between the cable 42 and the foam lower layer 24. The series of interconnected stones 10, 12 may then be connected to a power source by means of a power cord 50 with a standard plug 51.

Figure 3:
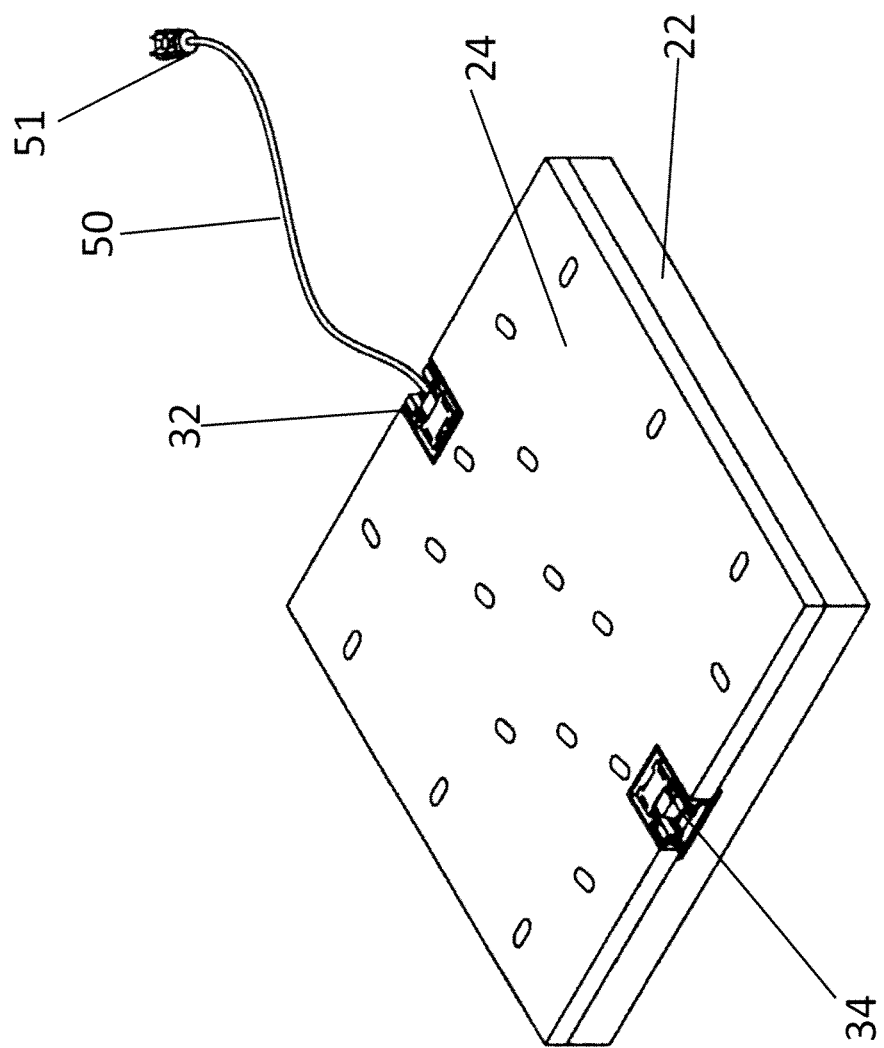
FIG. 3 is an underside perspective view of a single inline stone, according to one embodiment of the current invention.

With reference to FIG. 3, an inline stone 12 having an upper layer 22 and a lower layer 24 is shown upside-down with interconnections 32, 34 at opposite sides. In this view, the first interconnection 32 has connected within it a power cord 50, and the second interconnection 34 is unengaged.

Figure 4:
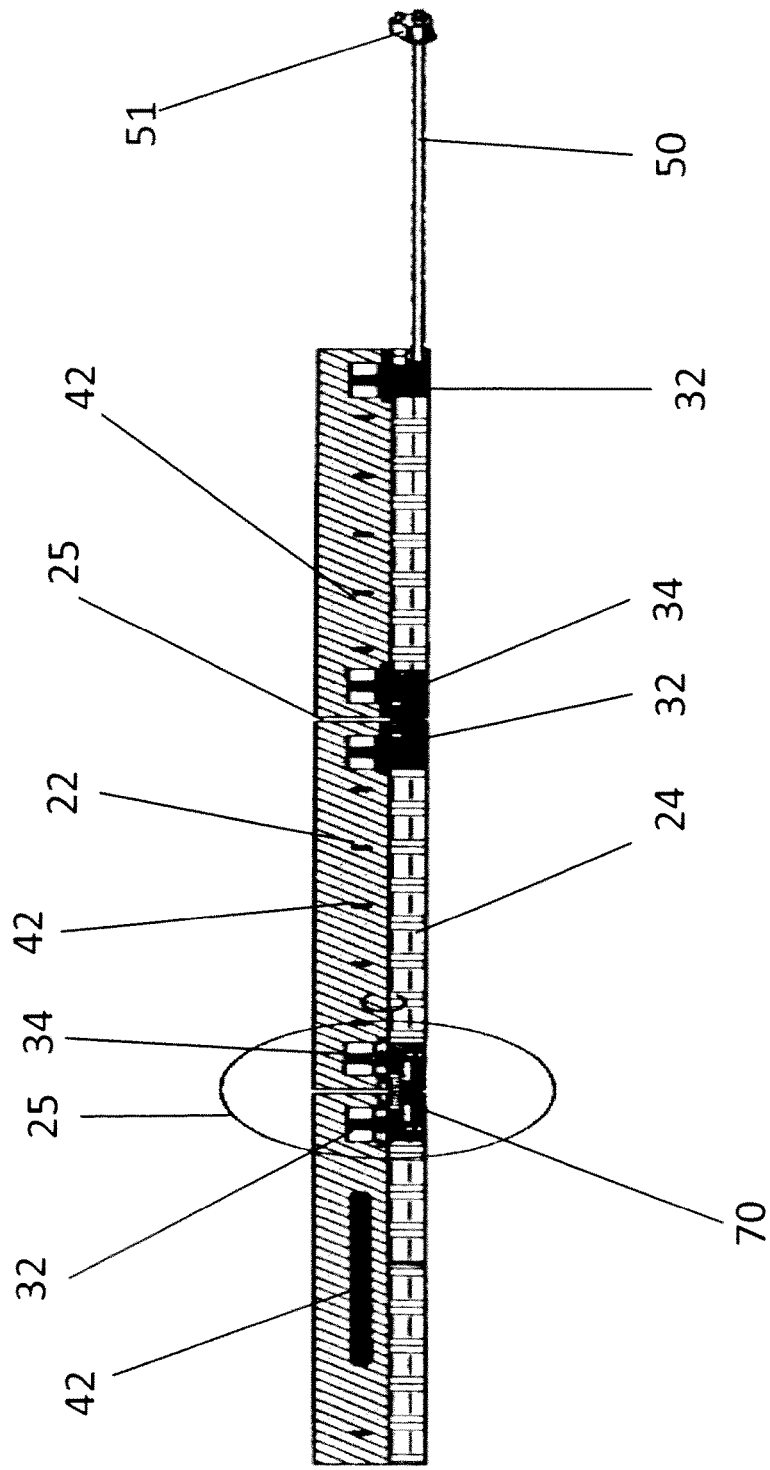
FIG. 4 is a cutaway side view of the patio stone system, according to one embodiment of the current invention.

With reference to FIG. 4, three inline stones 12 are shown from the side, each stone 12 having an upper layer 22 and a lower layer 24. The junction 25 (circled) between the stones is shown where first and second interconnections 32, 34 meet and are electrically joined by a bridging connector 70. The first interconnection 32 appearing at the end of the three inline stones is terminated by a power cord 50 having a standard plug 51 at the end, which power cord 50 is adapted to have a watertight fit into the first interconnection 32 by means of an adapter (not shown), explained in greater detail below. The standard plug may contain a resettable circuit breaker to ensure the current drawn is limited to a certain amount and prevent the user from installing too many heating stones on one circuit. A resettable circuit breaker may instead be positioned within the adapter (not shown), or an inline fuse.

Figure 5:
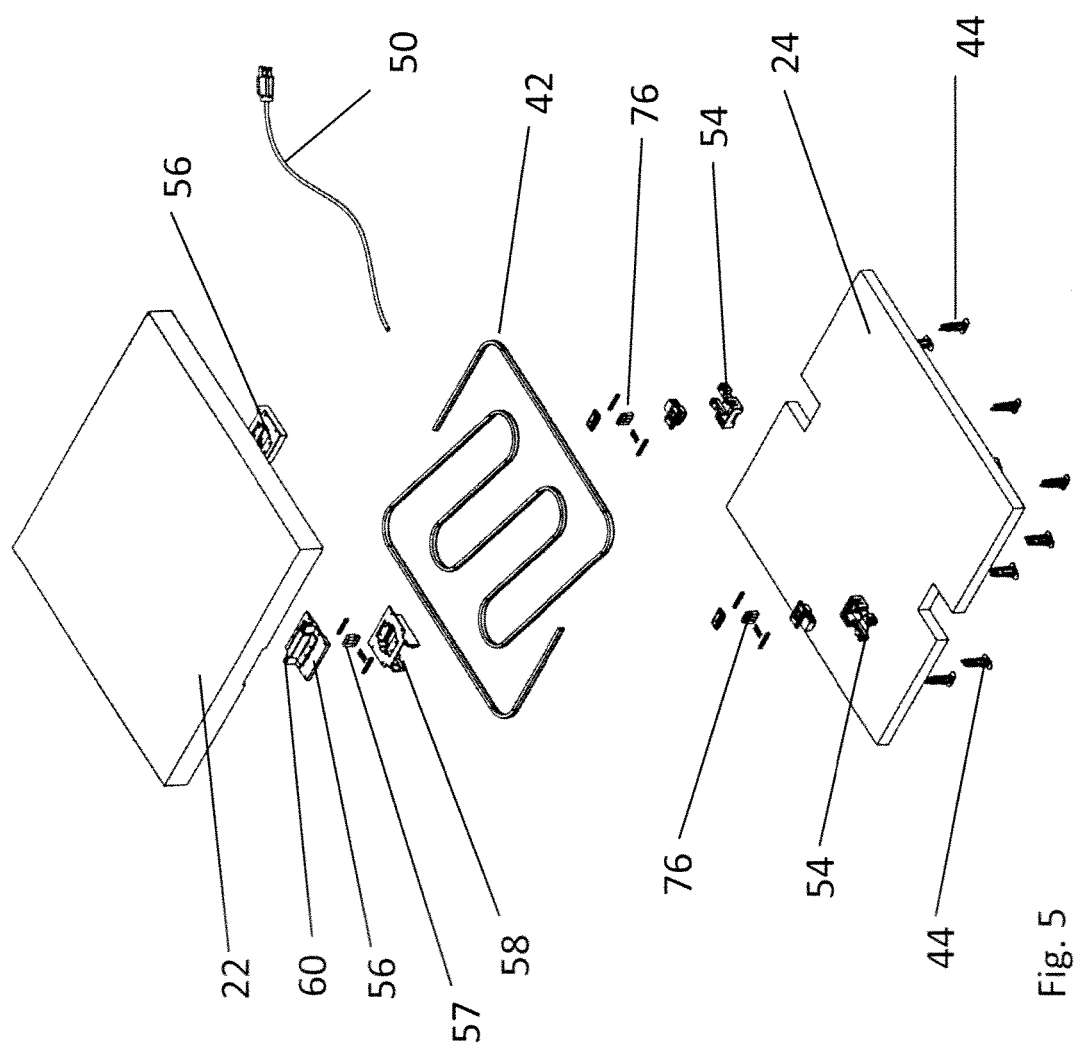
FIG. 5 is an exploded view of a patio stone, according to one embodiment of the current invention.
Figure 6:
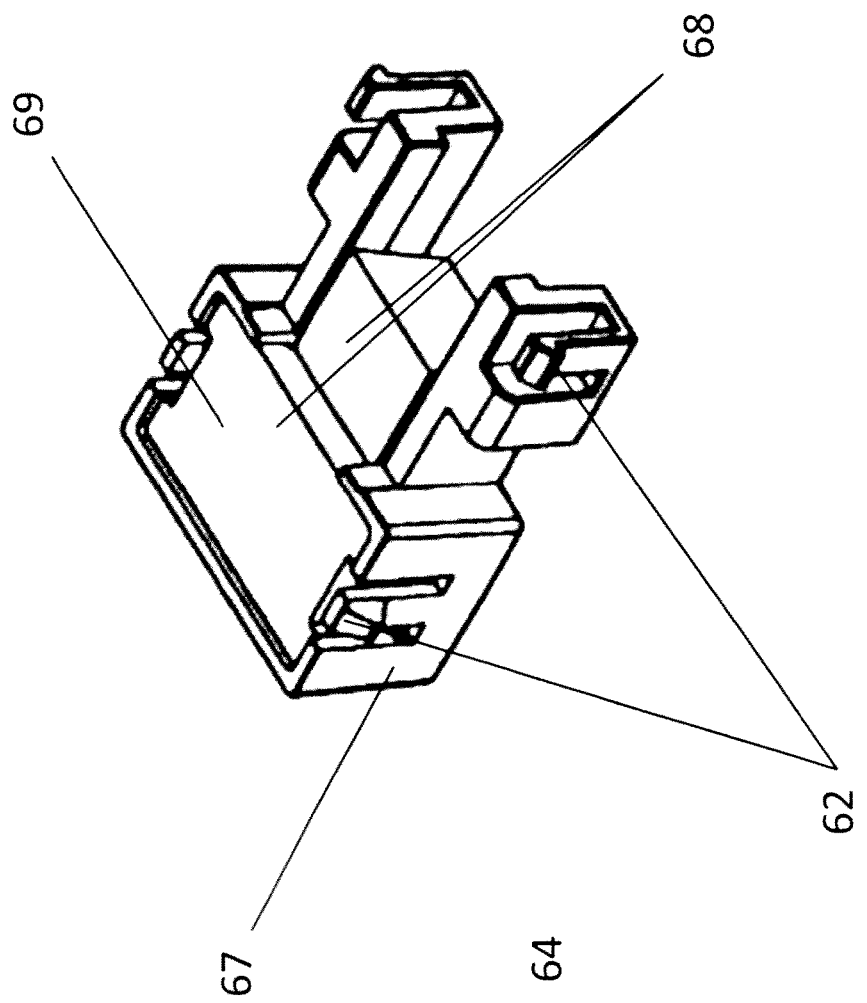
FIG. 6 is a perspective view, of an adapter, according to one embodiment of the current invention.

With reference to FIGS. 5 and 6, the interconnection 32, 34 is composed of three components forming the interconnection hardware: a bracket 56, an electrical linkage 57 and a receptacle 58. The bracket 56 is connected to the receptacle 58 by fastening means such as clips or latches, well-known in the art, with the electrical linkage 57 between the two. The receptacle 58 fits within the bracket 56 from below. The bracket 56 forms a physical connection with the cable 42, which is clamped within the cable lock 60, the cable lock 60 being a part of the bracket 56. The electrical linkage 57 fits between the bracket 56 and receptacle 58, so as to be able to form an electrical connection with the cable 42 that is clamped in the bracket 56, and the bridging connector (not shown) that is designed to fit within the receptacle 58. The receptacle 58 and bracket 56 may be molded as one piece. In effect, the electrical linkage 57 makes the electrical connection available within the receptacle 58. The electrical linkage 57 consists of electrically conductive material such as copper, which interfaces with the cable 42 so as to transmit electrical power to any plug that interfaces with the receptacle 58. An adapter 54, a terminating cap 64 or a bridging connector (not shown) may be placed within the receptacle 58 to create an electrical connection therewith. The receptacle 58 is designed to blind-mate with the adapter 54, terminating cap 64, or bridging connector (not shown) so that the receptacle 58 may be placed over top and the features of the receptacle will serve to guide the adapter 54, terminating cap 64, or bridging connector (not shown) into it, to fit snugly and to cause the latches 62 to engage and hold the adapter 54, terminating cap 64, or bridging connector (not shown) within the receptacle 58. The terminating cap 64 is used when the stone 10, 12 is a terminating stone in that no further stone 10, 12 is to be added to the side of the current stone 10, 12, and serves to return the electrical signal to the cable 42, so as to close the circuit.

Figure 10:
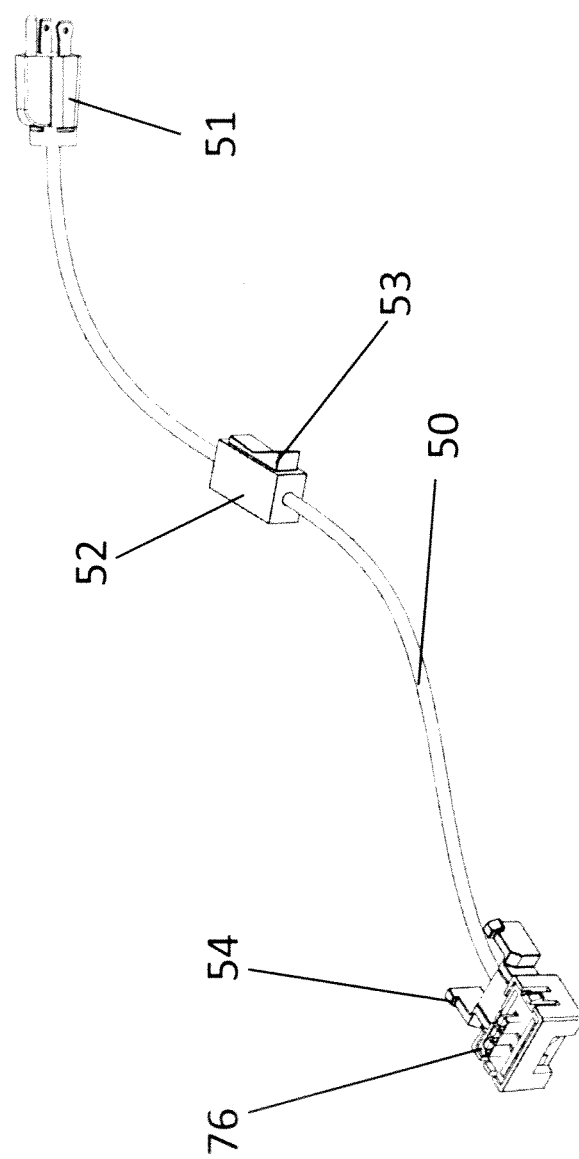
FIG. 10 is a perspective view of a power cord and the resettable circuit breaker, according to one embodiment of the current invention.

With further reference to FIGS. 5 and 6, when using cable that is self-terminating, there is no need for the electrical signal to be returned and the terminating cap 64 is merely a plastic plug that seals the interconnection (not shown) from water. Both adapter and terminating cap 64 have latches 62 positioned around the basin 67 edge, the latches 62 for engaging with the receptacle 58, which has corresponding sockets (not shown) to accept the latches 62. The latches 62, once engaged in the receptacle 58, ensure that the adapter 54 and terminating cap 64 may not be removed involuntarily. The adapter 54 and terminating cap 64 are molded from similar parts, the basin 67 and the cap 68 that fits within and seals the basin 67, the only difference being the cap 68, which may contain an electric plug 76 as shown in FIGS. 8 and 10, or a simple seal 69 without electrical connection as shown in FIG. 6. One skilled in the art would appreciate that many variations in shape and design for the basins 67, 72, 73 and the associated caps 68, 77, 78 may be used without deviating from the scope of the invention.

Figure 7A:
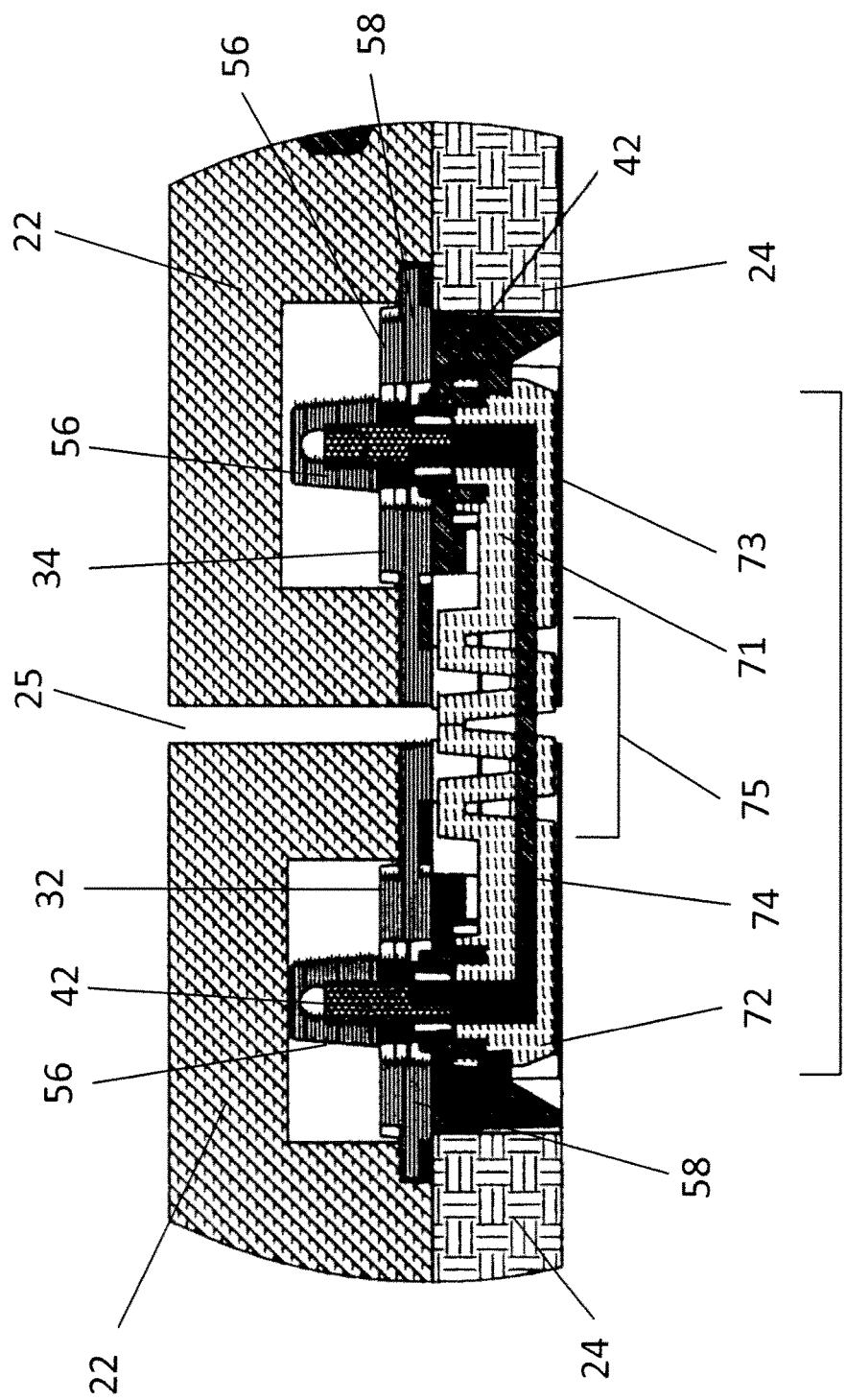
FIG. 7a is a detail view of the junction of two stones, according to one embodiment of the current invention.
Figure 8A:
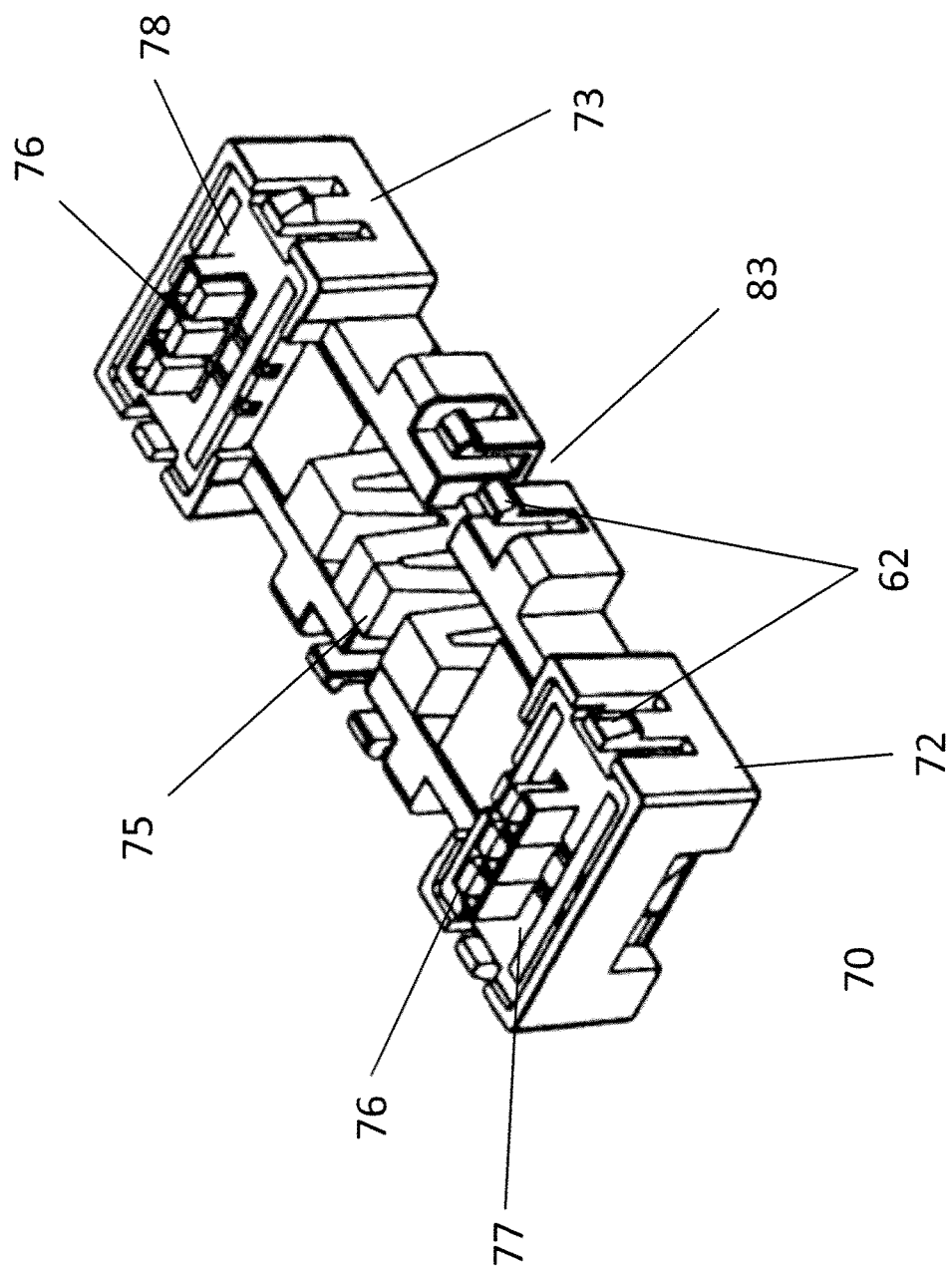
FIG. 8a is a perspective view of a bridging connector, according to one embodiment of the current invention.

With reference to FIGS. 7a and 8a, the junction 25 between two stones 10, 12 is shown in a detail view wherein the stones are connected by means of a bridging connector 70, shown in greater detail in FIG. 8a. The bridging connector 70 consists of two basins 72, 73, one on each side of the bridging connector 70, which basins 72 and 73 are not connected and are separated by a gap 83, and a single central piece formed of two caps 77, 78 connected by articulated section 75, which piece fits within and closes and seals the basins 72, 73 respectively. Specifically, the one piece formed of two caps 77, 78 connected by an articulated section 75 is closed and sealed from below by the addition of basins 72, 73 to each side of the one piece. The articulated section 75 consists of electrical wire 74 within a plastic housing 71 that is coiled or folded and is capable of expanding four or more inches as it uncoils or unfolds, permitting the spacing between the stones to be variable. The electrical wire 74 has a first side that is attached to the electrical plug 76 in cap 77, and a second side that is attached to the electrical plug 76 in cap 78. The caps 77, 78 may be sealed within the basins 72, 73 by use of a sealant such as silicone. In another embodiment, each of the basins 72, 73 is identical to the basin 67 of the adaptor 54 and terminating cap 64. The first basin 72 and cap 77 are designed to engage with the interconnection 32 corresponding in position to it, and the second basin 73 and cap 78 are designed to engage with the interconnection 34 corresponding in position with it. Therefore the bridging connector, once positioned between the two stones (not shown), serves to bridge an electrical connection between the two stones and forms a waterproof seal. Silicone or another sealing substance may be injected between the bridging connector 70 and the interconnections 32, 34 to assist in sealing the connection. The part of the bridging connector 70 between the basins 72, 73 contains an articulated section 75 which permits the basins 72, 73 and therefore the stones to be separated by a certain distance while the articulated section 75 retractably elongates.

Figure 7B:
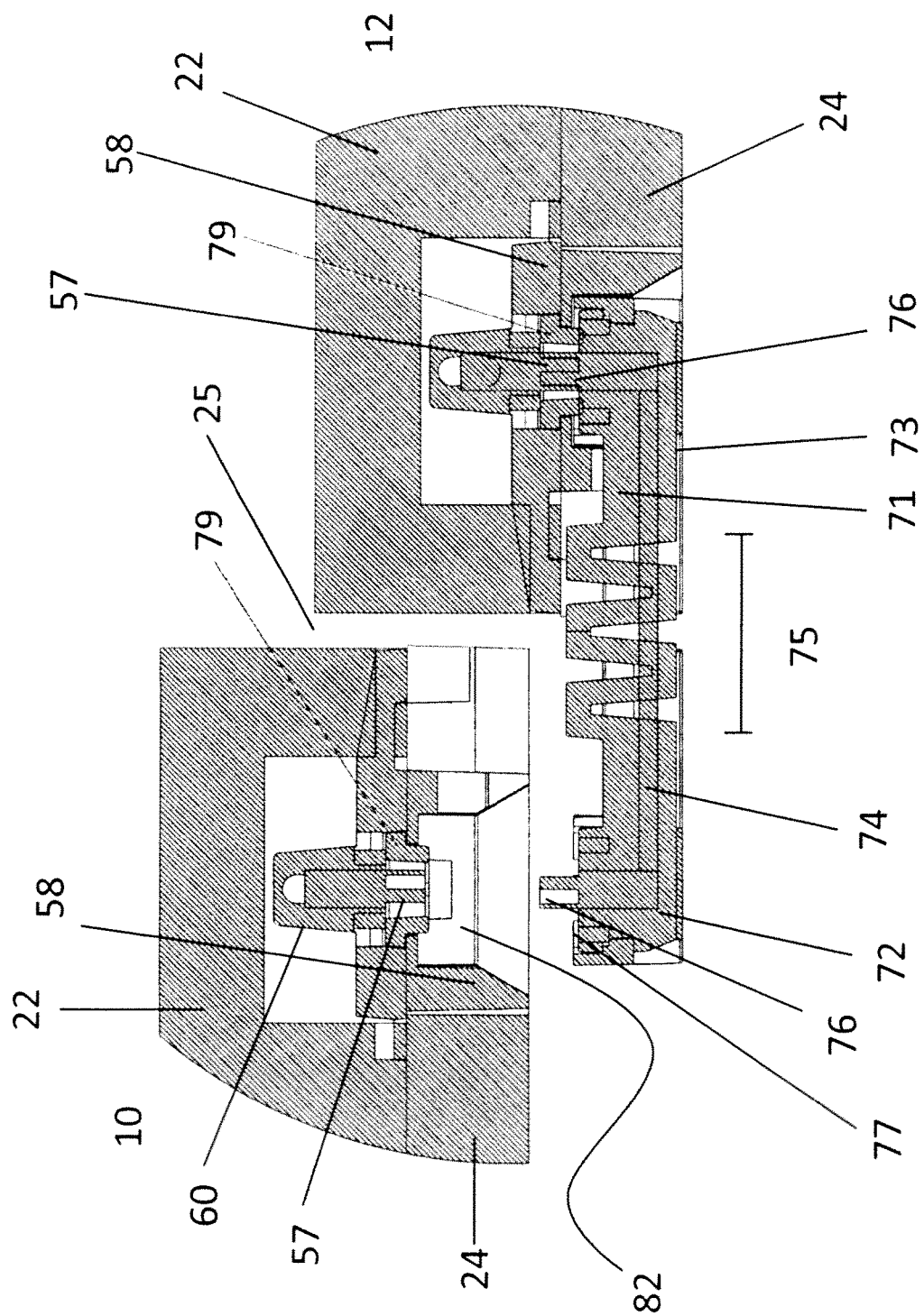
FIG. 7b is a detail view of a disassembled junction of two stones, according to one embodiment of the current invention.

With reference to FIG. 7b, the junction 25 between two stones 10, 12 is shown in a detail view wherein stone 12 is shown connected to the bridging connector 70, and stone 10 is shown disconnected from the bridging connector 70. The bridging connector 70 has a cap 77 containing an electric plug 76, which is designed to mate with the receptacle 58 of the interconnection 32 on stone 10. The mating ensures a positive connection between electric plug 76 and electrical linkage 57 between the cap 77 and receptacle 58, thereby ensuring an electrical connection between the wire 74 and the cable 42. The mating also has water sealing properties using three independent mechanisms: a sealing gasket 79 is positioned between the receptacle 58 and bridging connector 70, the receptacle 58 and bridging connector 70 seal to create a receiving area 82; and the electrical contacts 76, 57 are surrounded by a non-curing gel.

With reference to FIG. 8a, the bridging connector 70 also has latches 62 for engaging positively with receptacle 58. A gap 83 facilitates the extension of the articulated section and separation of one side of the bridging connector from the other. In one embodiment, the bridging connector 70 is formed from only two pieces of plastic molded together, a first piece being composed of the basins 72, 73 connected by the lower half of the articulated section 75, and a second piece being composed of caps 77, 78 connected by the upper half of the articulated section 75. To assemble the bridging connector 70, the electrical wire is placed within the first piece, and the second piece is molded on top of the first piece. In the cap 77, 78 of each basin 72, 73, the electrical wire 74 terminates in an electrical plug 76 which interfaces with the electrical linkage 57 of receptacle 58 on as to permit an electrical connection between adjacent stones 10, 12, which interface is sealed by sealing gasket 79.

Figure 8B:
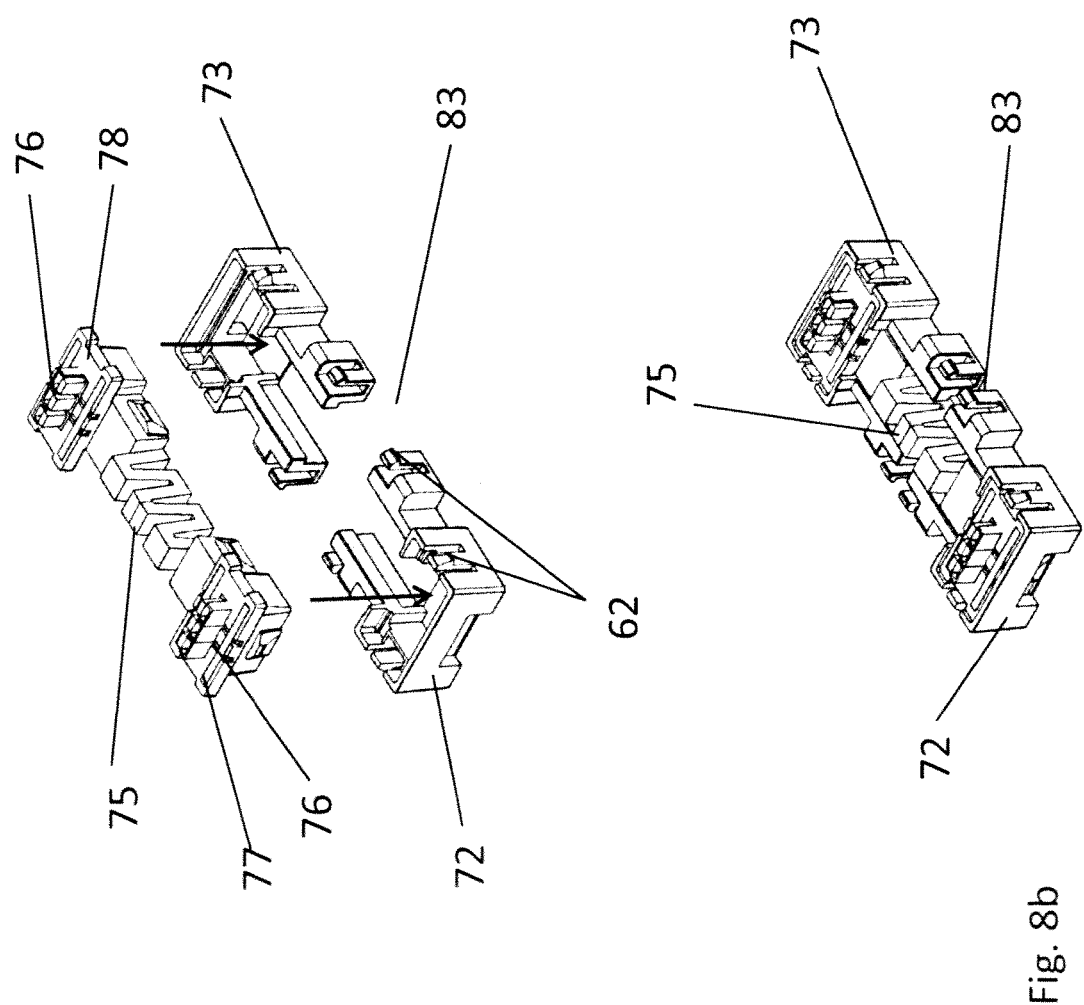
FIG. 8b is an exploded view of a bridging connector, according to one embodiment of the current invention.

With reference to FIG. 8b, the bridging connector is shown disassembled into its constituent parts for ease of manufacturing and assembly. The first central part consists of the articulated section 75 with a cap 77, 78 on each side, each cap 77, 78 containing an electrical plug 76. On each side of the first central part, is bonded a basin 72, 73 respectively. The two basins 72, 73 are not connected to one another; rather a gap 83 appears between them.

Figure 9:
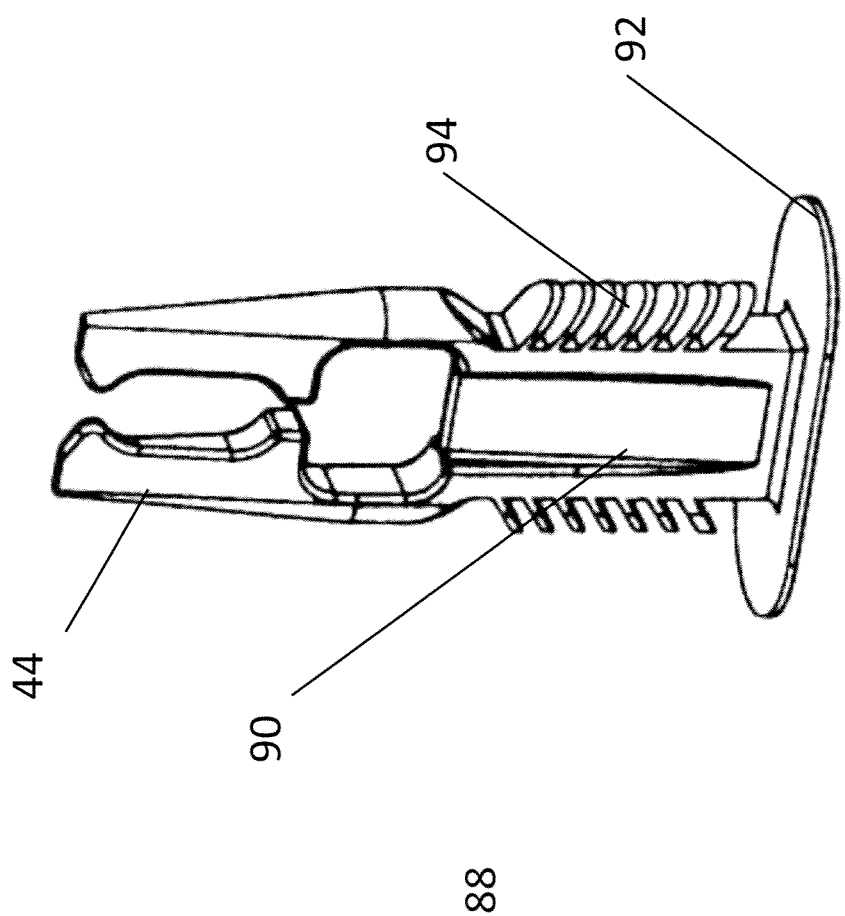
FIG. 9 is a perspective view of a clip structure, according to one embodiment of the current invention.

With reference to FIG. 9, the cable standoff 88 for holding the cable 42 is shown in detail. The cable clip 44 is wedge-shaped in profile and is located at the top of the cable standoff 88, and the lower extension 90 terminates in a stopple 92. The clip 44 is forced through the foam lower layer (not shown) from the bottom so that the cable standoff 88 passed through the lower layer, so as to project above the lower layer and permit the clip 44 to hold the cable 42. The stopple 92 is designed to stop the passage of the bottom of the cable standoff 88 through the lower layer so the stopple 92 remains below the lower layer, and ultimately sits flush with the underside of the lower layer. The fins 94 extending downwardly from the lower extension 90 prevent the cable standoff 88 from pulling out of the lower layer. In one embodiment the cable standoff 88 is molded from plastic.

With reference to FIG. 10, an adapter 54 is shown attached to a power cord 50, which cord is for an electrical connection to a power supply, and in this embodiment terminates in a standard household plug 51. The adapter 54 interfaces with the receptacle 58 by means of an electrical plug 76, to which the power cord 50 is mated to create an electrical path. A resettable circuit breaker 52 commonly known in the art is also shown, which serves to prevent damage to the patio stones circuitry caused by a short circuit or an overload from plug 51. When tripped by an overcurrent, the breaker 52 actuates switch 53, which moves from one position to another. It can be reset by means of pushing the switch 53 back to the original position, as is known in the art.

Figure 11:
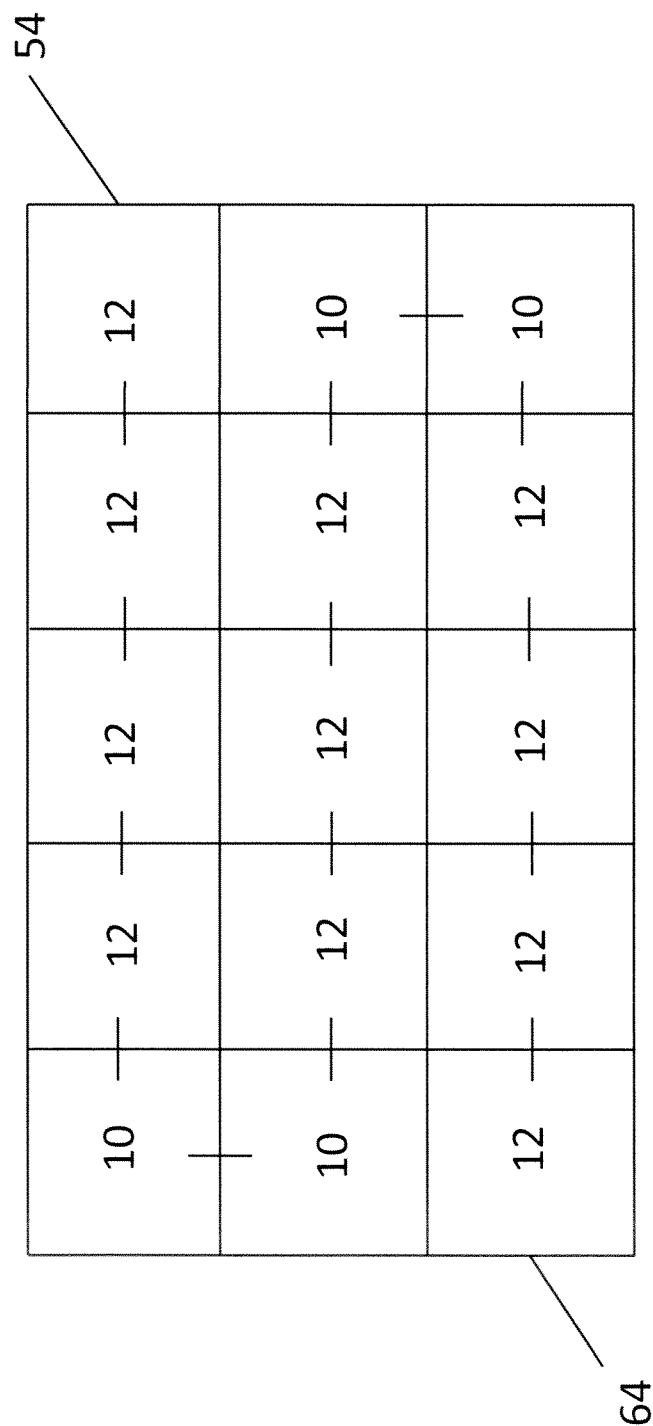
FIG. 11 is an example of an arrangement of stones, according to one embodiment of the current invention.
Figure 12:
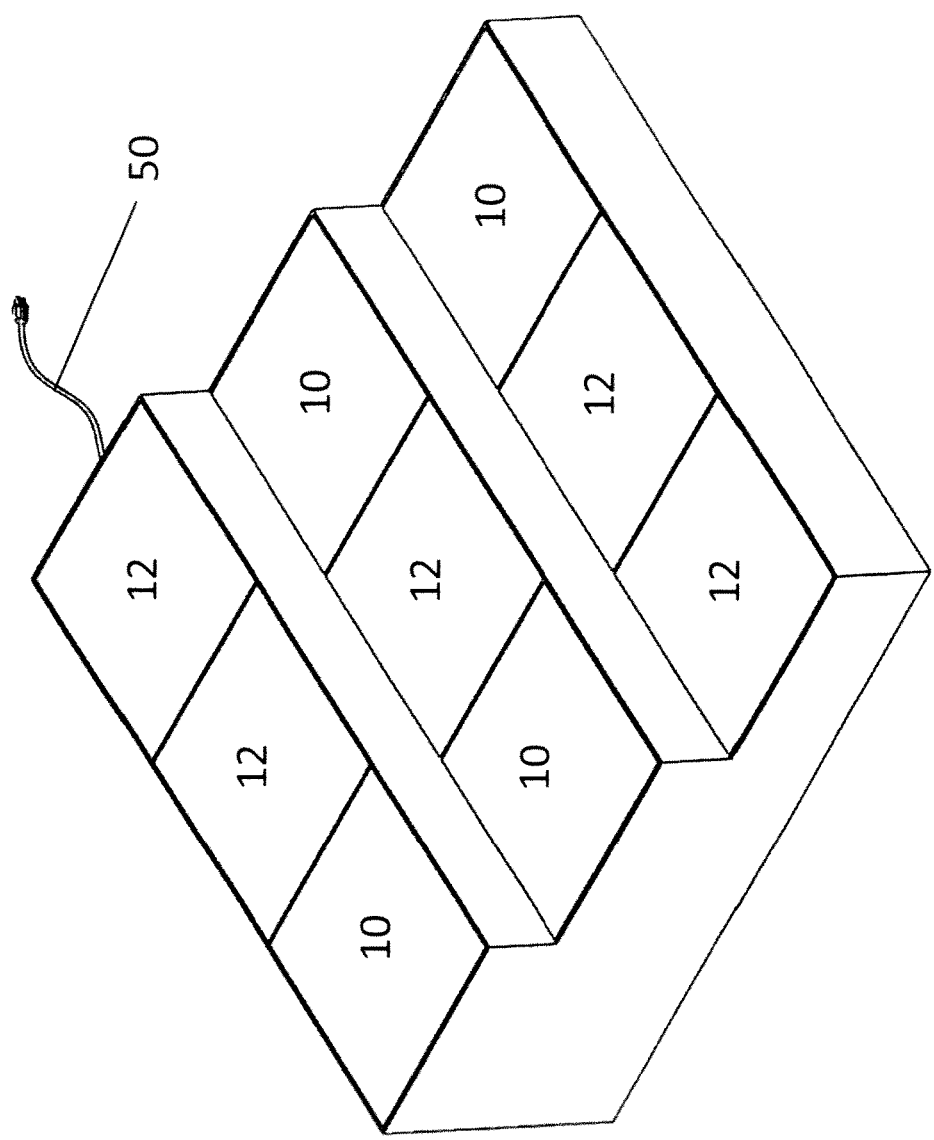
FIG. 12 is a further example of an arrangement of stones positioned in stairs, according to one embodiment of the current invention.

With reference to FIGS. 11 and 12, the stones may be pre-manufactured in the form of inline stones 12 and corner stones 10. The stones may therefore be arranged in a straight line, or any other pattern which is suitable. The number of stones that may be used in series will depend on the current limit of the circuit; on a 100 A breaker, with a consumption of 800 W per stone, the total number of stones permissible would be approximately 15. In an alternative embodiment, each stone draws 80 W and the breaker would reasonably be rated at 10 A-15 A. Therefore, with reference to FIG. 11 and as an example, a pattern could consist of three rows of five stones, and the pattern would begin with a first inline stone 12 having an adapter 54 and power cord 50 combination within its first interconnection 32. The second interconnection 34 of the stone would contain a bridging connector 70 which would bridge the inline stone to a second inline stone 12, which would have bridging connectors 70 on both sides, and so on until the fifth stone, which would be a corner stone 10, and would connect to a second corner stone 10, that is, the sixth stone, which would start the second row. Inline stones 12 would continue to the end of the second row, at which point a corner stone 10 would finish the second row, connecting to another corner stone 10 starting the third row. The third row would be completed with four inline stones 12, the last one terminated with a terminating cap 64. As for the arrangement of the stones, the heating cable contains the electrical return within it; therefore there is no need to close the pattern of stones to close the electric circuit of the heating cable 42. If a stone is the terminating stone in a line of stones, then it will have a terminating cap 64 at its terminating interconnection 32, 34, which will close the circuit. The cable 42 is a heating cable commonly known in the art, and would include constant watt heating cable, self-regulating heating cable and closed circuit heating cable, without departing from the scope of the invention. With reference to FIG. 12, the invention may be used for stairs as shown, the electrical connections extending the requisite distance between the stones.

Figure 13:
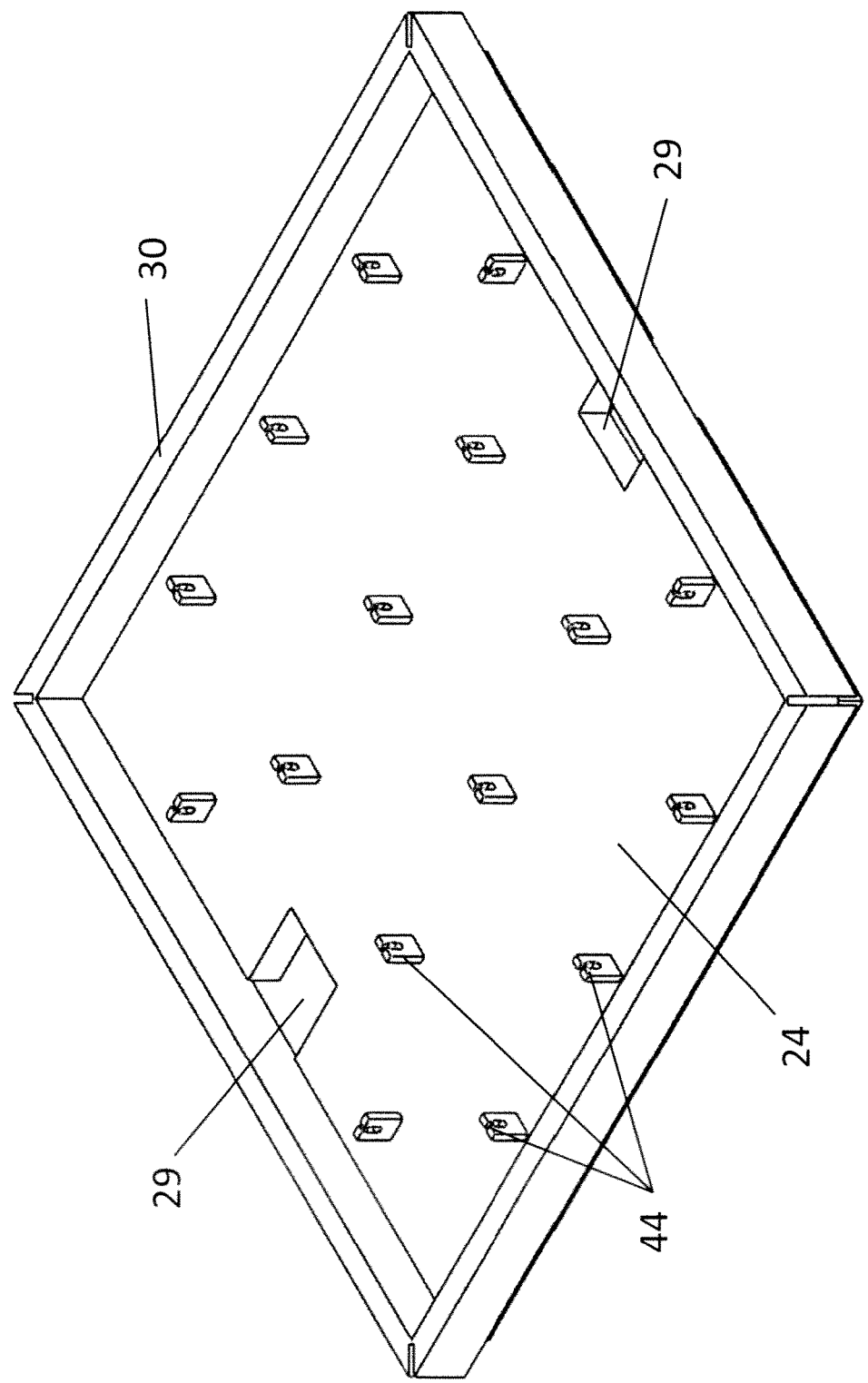
FIG. 13 is a perspective view of a closed frame surrounding the bottom panel of a patio stone, according to one embodiment of the current invention.
Figure 14:
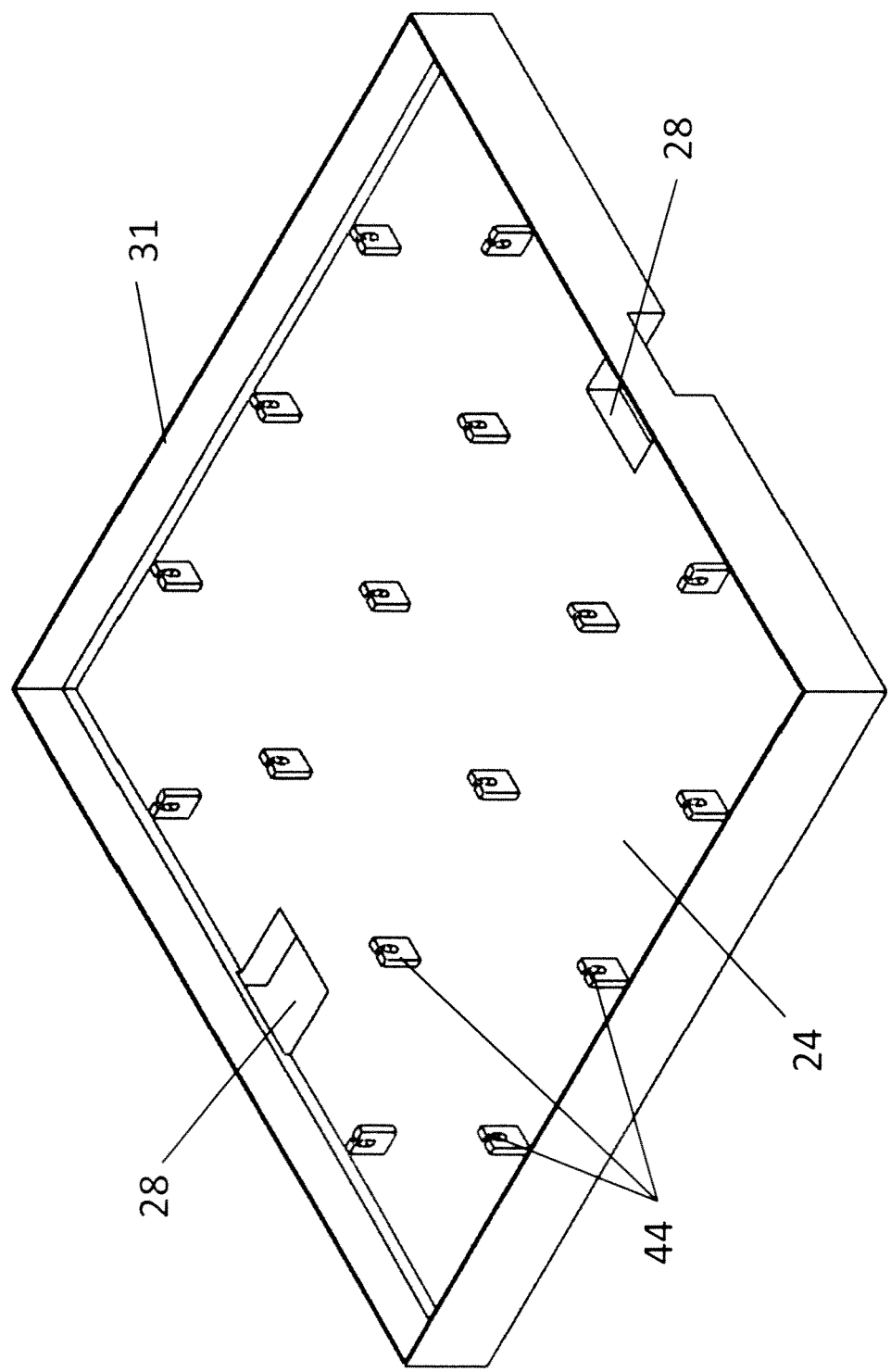
FIG. 14 is a perspective view of a breakaway frame surrounding the bottom panel of a patio stone, according to one embodiment of the current invention.

With reference to FIGS. 13 and 14, frames 30 and 31 are shown, which are incorporated with the lower layer 24 to form a mold into which concrete or another substance may be poured once the cable 42 has been positioned in the clips 44 as desired. FIG. 13 embodies a breakaway frame 30, a frame that is secured around the lower layer 24 and is intended to be removed once the concrete is poured and set. The breakaway frame 30 has two closed-ended apertures 29 for interconnections 32, 34; while the frame is in position the apertures 29 are blocked by the frame 30, until the frame 30 is removed and discarded, leaving the poured concrete forming the upper layer 22 (not shown) in place, and two apertures for fitting of the interconnections 32, 34 hardware as described above. The lower layer 24 as described above has clips penetrating the insulating material to hold the cable 42. Once the concrete is poured therein, the breakaway frame 30 is designed to be removed easily by breaking the pre-weakened corners. The breakaway frame 30 may be separate from the lower layer 24, or may be molded as part of the lower layer, but in either case is broken off after the concrete forming the upper layer 22 is poured.

With reference to FIG. 14, an alternative embodiment using a fixed frame 31 is shown that is molded as part of the lower layer 24 whereby the cable clips 44 are also molded into the lower layer 24. The fixed frame 31 is attached to the lower layer 24 and is not removed once the concrete is poured: instead it remains forming an additional seal against the elements. The fixed frame 31 has two open-ended apertures 28 for interconnection 32, intended to provide an opening for the interconnection hardware as described above, since the fixed frame 31 remains in place after the concrete is poured.

Although the invention has been described above by reference to certain embodiments of the invention, the invention is not limited to the embodiments described above. Modifications and variations of the embodiments described above will occur to those skilled in the art in light of the above teachings. Moreover, with respect to the above description, it is to be repulsed that the optimum dimensional relationships for the component members of the present invention may include variations in size, material, shape, form, funding and manner of operation.

Having thus described the invention, it is now claimed:
1. A heated patio stone system comprising:
 a first patio stone interconnected to a second patio stone, wherein each patio stone comprises:
 a load-supporting thermally-conductive upper layer;
 an insulating lower layer;
 an electrical heating cable positioned between the load-supporting thermally-conductive upper layer and the insulating lower layer;
 an interconnection having a receptacle interconnected to the electrical heating cable positioned within said each patio stone; and
 a bridging connector comprising:
 an expandable and retractable articulated section containing an electrical wire connected to the electrical heating cable of each of the first patio stone and the second patio stone to electrically connect the first patio stone to the second patio stone:
- a first basin on a first side of the expandable and retractable articulated section, closed by a first cap having a first electrical plug, the first electrical plug electrically connected to the electrical wire; and,
- a second basin on a second side of the expandable and retractable articulated section, closed by a second cap having a second electrical plug, the second electrical plug electrically connected to the electrical wire;

wherein:
- a length of the electrical wire from the first basin to the second basin is similar to a length of the bridging connector when the articulated section is in a fully expended state;
- at least a portion of the electrical wire is contained in between the first basin and the second basin of the bridging connector when the expandable and retractable articulated section is in a fully retracted state; and,
- the expandable and retractable articulated section of the bridging connector allows for limited movement of the first patio stone relative to the second patio stone.

2. The heated patio stone system of claim 1 wherein:
the first patio stone interconnection has a first patio stone bracket for attachment to the electrical heating cable of the first patio stone; and,
the second patio stone interconnection has a second patio stone bracket for attachment to the electrical heating cable of the second patio stone.

3. The heated patio stone system of claim 2 wherein:
a first patio stone interconnection:
- a. has a first patio stone electrical linkage that fits between the first patio stone bracket and a first patio stone receptacle; and,
- b. connects electrically with the electrical heating cable of the first patio stone;

a second patio stone interconnection:
- a. has a second patio stone electrical linkage that fits between the second patio stone bracket and a second patio stone receptacle; and,
- b. connects electrically with the electrical heating cable of the second patio stone;

the first patio stone bracket is attached to the electrical heating cable of the first patio stone such that the first patio stone electrical linkage is available within the first patio stone receptacle; and,
the second patio stone bracket is attached to the electrical heating cable of the second patio stone such that the second patio stone electrical linkage is available within the second patio stone receptacle.

4. The heated patio stone system of claim 1 wherein the load-supporting thermally-conductive upper layer of said each patio stone is made from a material selected from a group consisting of concrete, concrete with graphite or aluminum filler material and carbon-fiber reinforced polymer.

5. The heated patio stone system of claim 1 wherein the insulating lower layer of said each patio stone is made from a material selected from a group consisting of rigid foam, molded expanded polystyrene and Kevlar-fiber reinforced polymer.

* * * * *